United States Patent Office 3,310,316
Patented Mar. 21, 1967

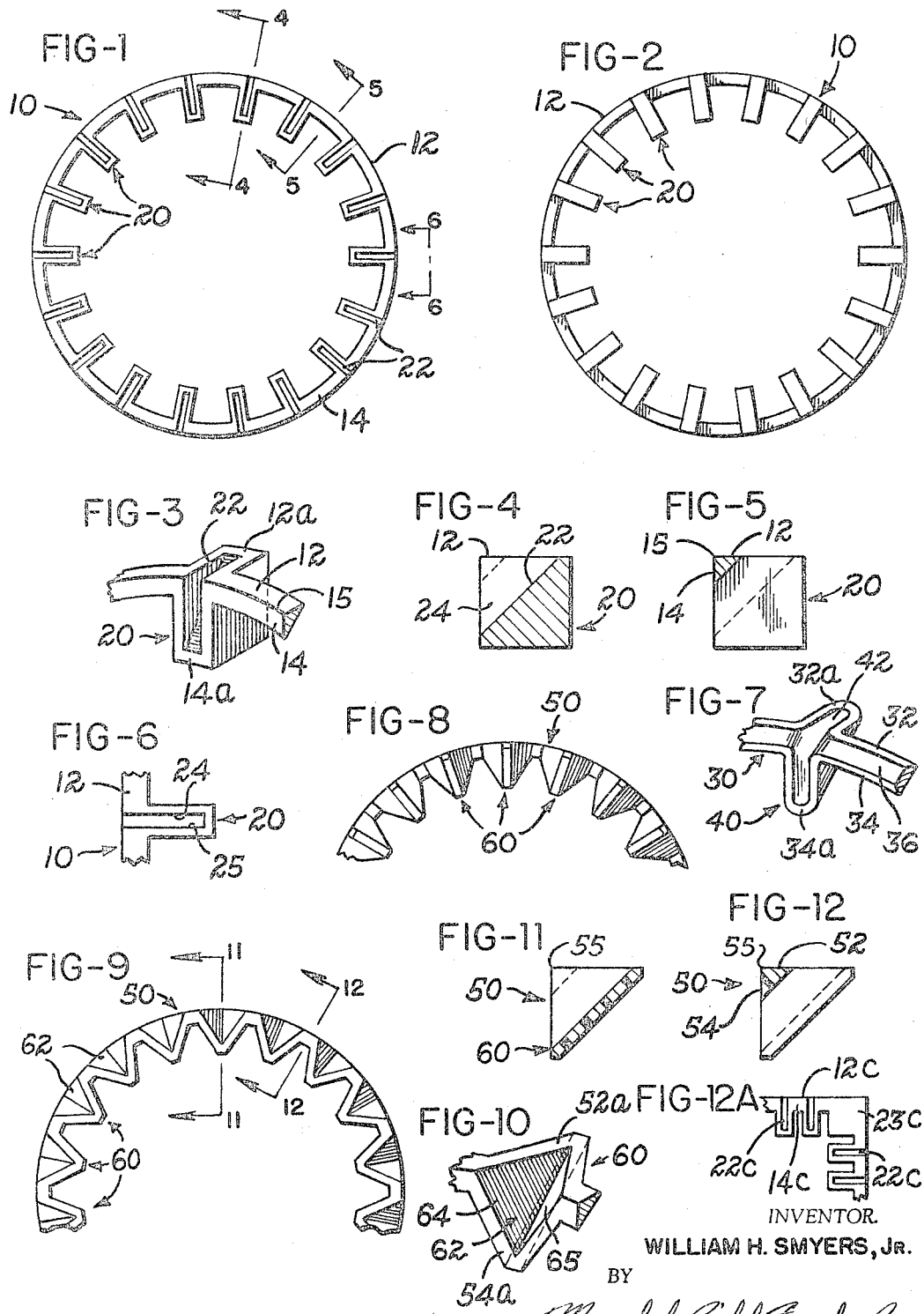

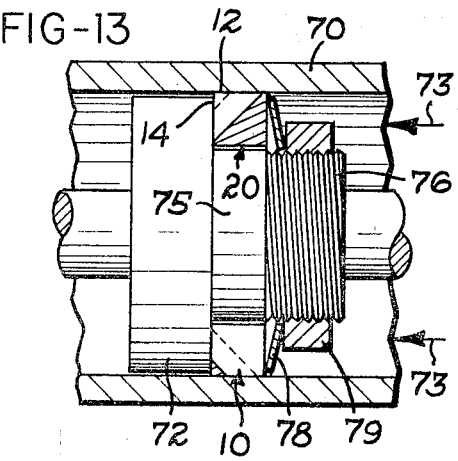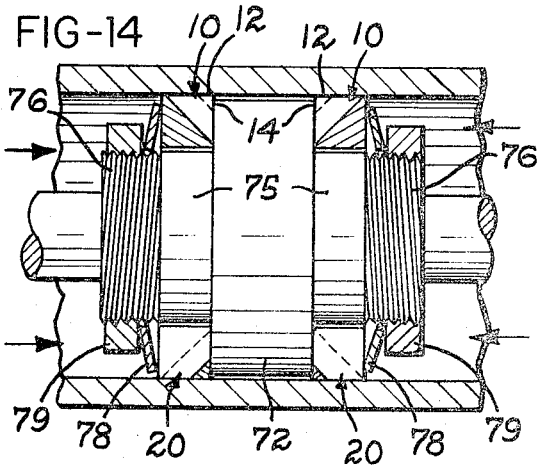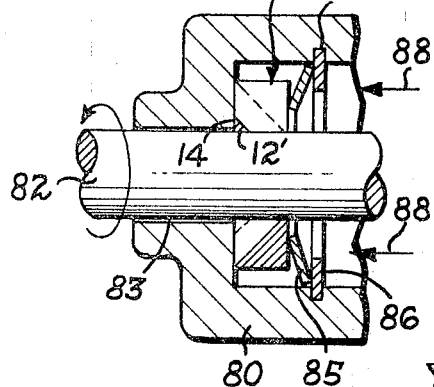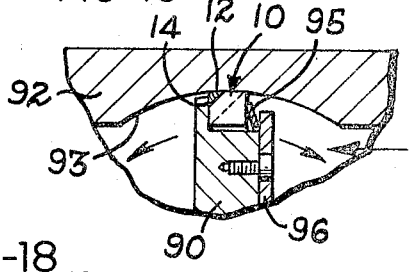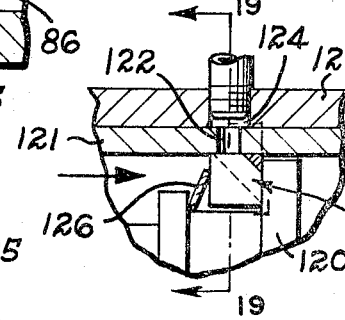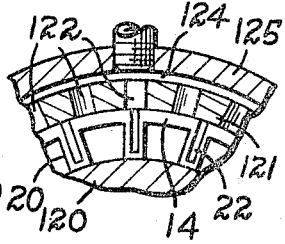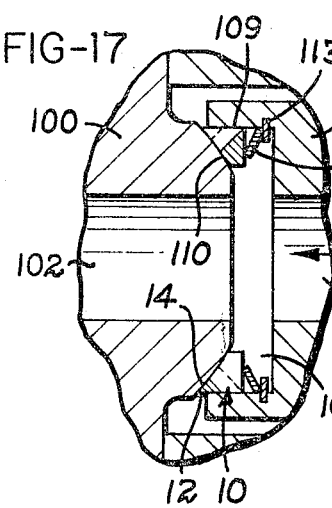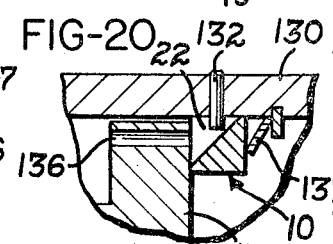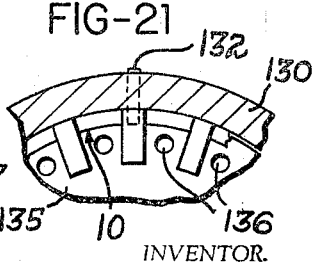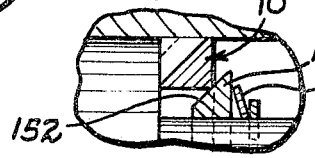

3,310,316
DYNAMIC SEALS
William H. Smyers, Jr., Dayton, Ohio, assignor to Koehler-Dayton, Inc., a corporation of Ohio
Filed Apr. 6, 1964, Ser. No. 357,374
8 Claims. (Cl. 277—102)

This application relates to a dynamic seal particularly adapted to prevent leakage of fluid under pressure between relatively moving parts.

The requirements for a dynamic seal will very according to the intended use. These seals for example may be required to withstand pressure differences of up to several thousand p.s.i. and they may be required to have corrosion resistant properties with respect to the fluids to which they are exposed, and in some instances, they may be required to maintain an effective dynamic seal over a wide range of temperatures, or under relatively high temperatures for extended periods.

The primary object of this invention is to provide a seal member which has these capabilities, and which is useful for maintaining a seal between parts which are relatively movable in a linear direction, or in a rotary direction, or in combinations of movements.

Another object of the invention is to provide such a seal wherein the high pressure against which a seal is desired, is utilized to maintain seating pressure of the seal against the relatively movable surfaces between which a seal is desired.

Another object of the invention is to provide such a seal which maintaining a continuous sealing surface over a generally circular path, and which has sufficient flexibility to maintain a continuous tight seal in spite of slight dimensional variations in the parts between which the seal is desired, such as might occur due to manufacturing tolerances or to thermal expansion or contraction of the parts, or to deflection due to high fluid pressures, but without creating a leak path such as the slot in a conventional piston ring.

A further object of the invention is to provide an endless ring seal having the aforementioned characteristics, and which is capable of withstanding high temperatures and high pressures even when subjected to corrosive fluids.

Another object is to provide such a seal which is spring-loaded for minimum leakage at low pressures.

Other objects and advantages of the invention will be apparent from the following description, the accompanying drawings and the appended claims.

In the drawings—

FIG. 1 is a plan view of one face of a ring seal as provided by the invention;

FIG. 2 is a view of the rear of the ring seal as shown in FIG. 1;

FIG. 3 is a perspective view, on an enlarged scale, of a segment of the ring seal shown in FIG. 1;

FIG. 4 is an enlarged sectional view taken on line 4—4 in FIG. 1;

FIG. 5 is an enlarged sectional view taken on line 5—5 in FIG. 1;

FIG. 6 is an enlarged segmental view taken generally on the line 6—6 in FIG. 1;

FIG. 7 is a view similar to FIG. 3, showing a modified form of seal;

FIG. 8 is a fragmentary view of another modified form of a seal in accordance with the invention, showing the face of this form corresponding to that shown in FIG. 2, i.e., the rear wace of the seal;

FIG. 9 is a broken plan view of the front face of the modified form of seal shown in FIG. 8;

FIG. 10 is an enlarged perspective view of a fragment of the seal shown in FIGS. 8 and 9;

FIG. 11 is an enlarged sectional view taken on lines 11—11 in FIG. 9;

FIG. 12 is an enlarged sectional view taken on line 12—12 in FIG. 9;

FIG. 12A is a view similar to FIGS. 1 and 9, showing a fragment of a seal which can be used in sealing between surfaces in which there is a sharp corner;

FIG. 13 is a sectional view illustrating a typical application of a seal such as shown in FIGS. 1–6 as used to maintain a dynamic seal between a piston and cylinder;

FIG. 14 is a view similar to FIG. 13 showing utilization of a seal such as shown in FIGS. 1–6 for maintaining seals on both sides of a piston in a cylinder;

FIG. 15 is a sectional view illustrating the use of a seal according to the invention as a rotary seal between relatively rotatable or reciprocating parts, or parts subject to side play, such as a shaft extending through a housing;

FIG. 16 is a fragmental sectional view showing the use of a seal according to the invention in a butterfly type of valve;

FIG. 17 is a sectional view illustrating use of the seal in a plug or ball type valve;

FIG. 18 is a fragmental sectional view illustrating use of the seal as both a circular seal and valving device in a spool type valve;

FIG. 19 is a sectional view taken on line 19—19 of FIG. 18;

FIG. 20 is a fragmental sectional view showing use of the seal in another form of valving arrangement;

FIG. 21 is a sectional view taken through the right end of FIG. 20, showing the seal ring and its retaining ring in elevation; and FIG. 22 is a sectional view showing the use of an intermediate ring between the seal and a biasing spring.

Referring to the drawings, which illustrate preferred embodiments of the invention, and particularly with reference to FIGS. 1–6, a ring type seal according to the invention is formed of an endless ring of material which may be molded from suitable synthetic substances, such as a tetrafluoroethylene resin (Du Pont Teflon) or which may be machined or otherwise formed from a suitable metal, such as stainless steel, or other suitable materials, such as carbon, ceramics, etc. and may be coated with low friction or wear-resistant materials. In any event, due to the construction of the seal, and the nature of the materials used, it will have sufficient resilience to accommodate contraction and expansion in a radial direction, as will be explained in greater detail. Thus, the seal member 10 is shown, particularly in FIGS. 3–6, as having a cylindrical sealing face 12 and a generally radially extending face 14. It will be appreciated that although the cylindrical face 12 is shown on the outer diameter or periphery of the ring, if desired, the structure could be inverted such that this cylindrical face is on the inner diameter of the ring, as later described in connection with FIG. 15. Likewise, the radially extending sealing face 14 may be in a plane intersecting the cylindrical face 12, or it may be formed as a portion of the surface of a cone or a sphere, depending upon the form of surface to which the seal will be applied. In general, however, the seal may be described as having a cylindrical sealing face and another sealing face which intersects the cylindrical face, or would intersect it if continued beyond its limits on the seal.

As seen particularly in FIGS. 3 and 5, these sealing surfaces intersect along an edge 15. At one or more locations around the periphery of the ring there are formed segments 20 which extend radially and laterally beyond the ring member itself. In the case of a ring seal machined from a metal band, the outside dimensions of these segments may represent the initial external dimensions of the blank from which the seal is machined. These segments have a slot-like opening 22 formed diagonally through them, to intersect the sealing faces 12 and 14. Thus, the remainder of the sealing face portions of these segments provide a continuation 12a of the cylindrical sealing surface 12 and a continuation 14a of the other sealing surface 14. Accordingly, the sealing surfaces can be described as being undulating or serpentine surface bands which have a common edge, the edge 15, and are generally parallel at a plurality of locations about the ring, and whcih extend apart in between these common edge portions, in the region of the segments 20. The sealing surfaces are joined in these regions by walls 24 and 25 of the slot or pocket 22 formed in these segments, thus by expansion or contraction of these pockets or slots in the enlarged segments, e.g., a "breathing" action, the circumferential and hence the radial dimensions of the ring seal can change, but the sealing surfaces presented by the ring are at all times continuous in both of the sealing directions.

The embodiment just described is adaptable to production by molding or machining, and is particularly desirable where a seal ring is to be machined from metal, such as stainless steel. It is also possible to produce a seal ring of like configuration by stamping from a sheet metal blank. A fragment of such a modified form of ring is shown in FIG. 7, such fragment corresponding to the view shown in FIG. 3. In the modified form the seal ring 30 includes sealing surfaces 32 and 34, and the segments 40 are formed as parts struck from a larger part of a sheet metal blank. Essentially the only difference between this structure and that previously described is that the sealing surfaces 32 and 34 do not have a common edge, but at their closest locations they are separated by the surface portion 36, while the continuations of these surfaces, formed as the edges of the segments designated 32a and 34a, again form continuations of the sealing surfaces to give the continuous undulating or serpentine configuration. The portion of the segments 40 opposite the slots 42 therein, or in other words on the other side of the ring member, are also angled, since the extra material is not present as is shown in FIG. 4. In other respects this form of the seal ring is essentially the same as previously described and functions in like manner.

Another form of seal ring according to the invention is shown in FIGS. 8–12. Due particularly to the formation of the spaced segments and slots therein this form may be advantageous where it is desirable to mold the ring from synthetic material, since these shapes may provide for easier "release" of the ring from the mold matrices, and can also be a benefit because of a change in the deflection of the walls under pressure. In this configuration the continuous ring member 50 includes the sealing surfaces 52 and 54, as shown particularly in FIGS. 10–12. These surfaces may be arranged to intersect along an edge 55, as shown, or if desired they may be spaced somewhat apart, for example in the manner shown in the modification illustrated in FIG. 7.

The spaced enlarged segments 60 are formed of generally V-shape, as seen particularly in FIG. 10, and the openings or pockets 62 which are formed in these segments are provided by intersecting walls 64 and 65. As in the other embodiments, continuations of these sealing surfaces, designated 52a and 54a, extend around the periphery of each enlarged segment and the pocket 62 therein, in order to maintain a continuous sealing surface of the desired undulating or serpentine configuration.

The present invention also may be applied to intersecting surfaces other than in around or oval centers. For example a seal according to the invention can be used to seal against any cylindrical surface (definition from solid geometry) or it can be used to seal between surfaces whose theoretical line of contact does not form a continuous or endless loop. For example, a portion of a seal of the form shown in FIGS. 1, 7 or 9 or as shown in FIG. 12A, my be used effectively for sealing along a straight or curved line, such for example as along the side edges of the vanes of a vane-type pump or in other application where it is desired to seal along the intersections of relatively moving surfaces. FIG. 12A shows a corner of a modified form of the seal as shaped for use in a cylinder of square or rectangular cross-section. Here, the sealing surfaces are the surfaces 12c and 14c, and the slots 22c are provided in the same manner as described heretofore. In the region where the surfaces against which the seal should be made to intersect at a sharp angle, i.e., the corner, the seal member may have a solid section 23c, as shown.

One of the principal advantages of seal loops such as described above results from the continuous sealing surfaces which are provided on a seal loop that can expand or contract radially, to maintain contact with the surfaces to be sealed against leakage of pressure fluid. By proper engineering design and material selection, a seal loop can be provided which is useful at high temperatures, and with cryogenic materials. By regulating the effective area of the sealing surfaces and regulating the amount of radial and axial spring force, the wall thickness and taper, width and length, and the number and shape of slots, and choosing an applicable seal material, an effective seal can be provided which offers low leakage, good flexibility, low wear and relatively low and precisely controlled friction resistance to movement of the relatively movable parts to be sealed.

In certain instances, the seal rings as provided herein can also be dimensioned to fit within standard O-ring grooves, and thus they can be provided as replacement parts where conventional O-ring seals are ineffective for some reason. Also, as will be described, it is possible to arrange the seal ring, as will be described in the examples, such that it is pressure loaded, and the effect of a high pressure, against which the seal is made, is to augment the sealing action of the seal member, thereby minimizing leakage past the seal ring.

FIGS. 13 and 14 illustrate conventional applications of a seal ring in accordance with the invention to maintain a seal between a cylinder and a piston, with either the cylinder or the piston movable longitudinally with respect to the other. In the examples, for purposes of illustration and explanation, the seal ring shown and described in FIGS. 1–6 is used, but it will be understood that the other embodiments of seal rings which previously have been described are equally adaptable for these purposes.

In FIG. 13 the seal is shown applied to form a continuous seal between a cylinder member 70 and a piston 72 which is dimensioned to have a slight radial clearance with respect to the inner cylinder wall. At the high pressure side of the piston 72, indicated by the arrows 73 which are intended to represent the direction in which the higher fluid pressure is applied to the seal, there is a mounting shoulder or neck 75 having a threaded outer end 76. The seal ring 10 is fitted over the neck 75, and thus the sealing surface 14 is placed against a face of piston 72 and the sealing surface 12 engages the inner wall of the cylinder. The seal is spring-loaded by a disc spring 78 (e.g. a Belleville spring of conventional construction) which is urged against the back face of the enlarged segments 20 of the seal ring by tightening a nut 79 against this spring. In addition to this spring pressure, the higher pressure of the fluid within the right-hand side of the cylinder will act on the seal ring tending to force the sealing surfaces into contact with the piston and cylinder walls respectively.

The application illustrated in FIG. 14 is essentially a duplication of that in FIG. 13, to show the use of the seal rings in a double-acting piston-cylinder actuator, where high pressure may be applied alternatively to either side of the piston. Since the seal ring, the spring washer, the retaining nut, and the other parts are essentially the same as shown in FIG. 13, the same reference numerals have been applied, and it will be understood that this arrangement provides an effective high pressure seal between the moving parts against pressure differentials in either direction across the piston 72.

In FIG. 15 the seal ring 10 is shown applied to retain fluid under pressure within a housing 80 having a rotatable and/or reciprocable shaft 82 extending through and projecting outwardly from the bore 83. Of course, the seal will function just as well where the shaft might be stationary and the surrounding housing portion rotates, since the motion between the surfaces to be sealed is merely relative. Likewise, the seal will accommodate side play due to eccentricity of the shaft with respect to the bore, or due to shaft whipping, etc. Here, the seal ring 10 is held in place by a Belleville or spring washer 85 held in place by a removable snap ring 86 which seats in a circular slot 87 covered within the housing. Again, the higher pressure fluid is indicated by the arrows 88, as being internal of the housing 80, and this pressure will act on the back face of the seal member 10 tending to promote contact of the sealing surfaces 12 and 14 with the housing and shaft surfaces between which a seal is desired. It should be noted that here the sealing surface 12 is formed as a cylindrical surface at the inner diameter of the seal ring, rather than at the outer diameter, but otherwise the construction of the seal member is the same as shown in FIGS. 1–6. This type of seal ring may be described, in other words, as an inverted arrangement.

In FIG. 16 the seal ring 10 is shown applied to a butterfly valve 90 rotatable within a valve housing 92, and wherein a seal is desired between the periphery of this valve and the appropriately shaped sealing surface 93 of the valve body. Here, the seal ring 10 is held in place by a spring washer 95 which is in turn retained by a plate or ring 96 bolted or otherwise suitably fastened to the valve member 90. The seal ring 10 is again oriented such that the higher fluid pressure is on the side of the ring opposite from the sealing surface 14, and acts to augment the seating force of the spring washer 95.

FIG. 17 illustrates the application of a seal ring according to the invention to a ball valve or the like in which the valve member 100 is rotatable about a vertical axis and is provided with a transverse port 102.

This port is arranged, when the valve is open, to mate with ports in the valve body 105, for example the inlet port 106 shown in FIG. 17, in which exists a higher fluid pressure as indicated by arrow 107. This inlet port preferably opens into a recess 108 in which the seal ring 10 is mounted, the outer sealing surface 12 facing the cylindrical internal surface 109 of the recess, and the other sealing face 14 seating against the generally spherical sealing surface 110 of the valve member 100. The ring 10 is pressed against the valve member by the spring washer 112, which may seat against the retainer ring 113 mounted within the recess 108. In this configuration the fluid under pressure acts both when the valve member is open and closed to urge the sealing surfaces of the seal ring into contact with the respective surfaces on the valve body and the valve member.

FIGS. 18 and 19 illustrate another use of the seal ring 10, wherein the piston 120 is part of the spool structure in a servo-valve or the like. This piston is movable within valve sleeve 121 having a port 122 which communicates with the interior of the sleeve 121 and with a port or duct 124 formed in the valve housing 125. Preferably, the sleeve 121 includes a plurality of ports 122, as shown in FIG. 19, and the port 124 can be formed as a circumferential groove or slot. In the position of the parts as shown in FIG. 19, the seal member 10 and piston 120 is in an intermediate position. If the piston is moved further to the left (FIG. 18), port 124 communicates through hole 122 with the area to the right of the piston, and the area to the left of the piston is isolated from port 124. If the piston is moved further to the right from the position shown in FIG. 18, the area to the right of the piston is isolated, and port 124 then communicates with the area to the left of the piston. The seal ring is held in sealing position against a face of the piston 120 and against the inner surface of the sleeve 121 by a spring washer 126 suitably mounted on the piston.

The embodiment shown in FIG. 21 provides both a seal and a valving arrangement. Here, the cylindrical body 130 is provided with a locating pin 132 which extends into one of the slots or pockets 22 of the seal ring 10. A rotatable valve member 135 is provided having a number of passages 136 which extend therethrough and which in one position of the member 135 (as in FIG. 20) can communicate with the interior of the slots 22. In this position, higher pressure fluid to the right of the member 135 will be sealed off from the left side of this member, as viewed in FIG. 20. By rotating the member 135 the passages 136 can be moved across the sections 14a of the seal member such that these passages are then aligned with the space between segments 20 (as in FIG. 21), and a through passage is provided between the opposite sides of the member 135. Again, the seal ring 10 is urged into sealing position by a spring washer 137.

FIG. 22 shows the use of an intermediate force transmitting ring member which may be desirable to direct the sealing force from the biasing spring to or against the seal, thereby providing a predetermined component of sealing force against each seal face. In this embodiment the seal ring is designated 10, because it is the same type of ring as previously described, and the intermediate or force transmitting ring 150 is shown including a beveled face 152 engaging the seal of the corner thereof opposite the sealing faces. The washer type spring 154 may be of the same type as the spring 78 previously described, or any other suitable form of spring may be used. Depending upon the angle of the beveled face 152, the force derived from the spring may be distributed to both sealing faces of the seal in any desired proportion.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A sealing member for maintaining continuous sealing contact between first and second surfaces, extensions of which will intersect, said member comprising an integral loop of material provided with first and second sealing faces having substantially the same angular relation as between said surfaces, each of said sealing faces being formed of surface bands of substantially greater length than the circumferential dimension of said member, said surface bands being arranged to separate from each other at at least one location about said loop and being generally parallel to each other in the remaining portions of said bands about said loop to define continuous bands which can change the effective circumference of the loop by changing of the contour of the bands at said location and wall sections formed in said member interconnecting the separated sections of said sealing faces forming at least one slot in an edge of said loop adapted to face said surfaces whereby said bands form extensible continuous sealing faces for engaging both said surfaces.

2. A sealing member for maintaining continuous sealing contact between two relatively movable surfaces extending at a predetermined angular relation to each other, said seal member comprising an integral ring-like member of resilient material, a first sealing face formed along one edge of said ring, a plurality of segments formed on said member of substantially greater width than the remainder of said member, said segments extending to one side of the remainder of said ring member in a direction opposite from said first sealing face whereby an edge of each of said segments is continuous with said first sealing face, said member having a second sealing face formed along an adjoining side of said ring member and continuous portions of said segments, said first and second faces having essentially the same angular relation as said two surfaces, and each of said segments having a slot-like opening therein extending across the portions thereof which are part of said sealing faces to define sealing surface portions on said segments which extend laterally from the corresponding sealing faces on the remainder of said ring member to define sealing faces which are of serpentine form about the entire said member.

3. A sealing member for maintaining continuous sealing contact between a cylindrical surface and another surface extending at an angle to said cylindrical surface, said seal member comprising an integral ring of resilient material having a first predetermined radial dimension, a cylindrical sealing face formed along said ring at said radial dimension, a plurality of segments formed thereon of substantially greater radial dimension and of substantially greater width than the remainder of said ring member, said segments extending radially beyond the remainder of said ring member in a direction opposite from said cylindrical sealing face whereby an edge of each of said segments is continuous with said cylindrical sealing face, said member having another sealing face formed along an adjoining side of said ring member and continuous portions of said segments, and each of said segments having a slot-like opening therein extending across the portions thereof which are part of said sealing faces to define sealing surface portions on said segments which extend in a lateral and in a radial direction from the corresponding sealing faces on the remainder of said ring member to form continuous sealing faces of serpentine form about the entire said ring member.

4. A continuous ring seal adapted to maintain sealing contact with a cylindrical surface and another surface extending at a predetermined angle to said cylindrical surface, at least one of said surfaces being movable with respect to the other, said seal comprising an endless ring-like member having two continuous surface portions of appreciable width forming first and second sealing surfaces on two adjoining sides of said member and having a common edge boundary over portions of said member, the remainder of said first and second sealing surfaces between said common edge portions defining the opposite sides of at least one pocket segment on said member, and said sealing surfaces being arranged to make continuous contact with said cylindrical surface and said other surface over bands of substantially greater length than the circumferential dimension of said members to accommodate radial flexure of said member while maintaining a continuous seal between said surfaces.

5. In combination with a cylindrical surface and another surface extending at an angle thereto, at least one of said surfaces being movable relative to the other, said surfaces defining boundaries of a space adapted to contain fluid under pressure; a seal construction cooperable with said surfaces to prevent passage of the fluid between said relatively movable surfaces, comprising a continuous ring member having a cylindrical sealing face engaging said cylindrical surface and a second sealing face engaging said other surface, a plurality of enlarged segments formed as integral parts of said ring member extending laterally and radially therefrom in opposite directions from said sealing faces, each of said segments including sealing face portions interconnecting the parts of said sealing faces between said segments and forming continuations of the respective said sealing faces, said segments having pockets formed therein extending from one sealing face portion to the other to provide for continuous engagement of both said sealing faces with said surfaces about the periphery of said ring member, and spring means acting on said ring member tending to maintain said sealing faces in contact with the respective surfaces.

6. In combination with two angularly related and relatively movable surfaces, said surfaces defining a boundary of a space through which boundary it is desired to prevent a flow of fluid under pressure, a seal construction cooperable with said surfaces to prevent passage of the fluid between said relatively movable surfaces, comprising a continuous ring member having first and second sealing faces engaging said surfaces respectively, at least one enlarged segment formed as an integral part of said ring member extending laterally therefrom in a direction parallel to each said sealing face, said segment including sealing face portions interconnecting the parts of said sealing faces on opposite sides of said segment and forming continuations of the respective said sealing faces, said segment having a pocket formed therein extending from one sealing face portion to the other to provide for continuous engagement of both said sealing faces with the respective said surfaces, and spring means acting on said ring member tending to maintain said sealing faces in contact with the respective surfaces.

7. A sealing member for maintaining continuous sealing contact between first and second surfaces, extensions of which will intersect, said member comprising integral lengths of seal material corresponding in length to the surfaces against which the seal should be made, first and second sealing faces on said seal member having substantially the same angular relation as between said surfaces, each of said sealing faces being formed of surface bands of substantially greater length than the length dimension of said member, said surface bands being arranged to separate from each other at at least one location along the length of said member and to extend in generally parallel relation to each other along the remainder of said member, and wall sections formed in said member interconnecting the separated sections of said sealing surfaces forming at least one slot in an edge of said member adapted to face said surfaces whereby said bands form extensible continuous sealing faces for engaging both said surfaces.

8. A seal construction for sealing two surfaces, extensions of which will intersect, said construction consisting of a seal member adapted to lie along the intersection between said surfaces and having two sealing faces arranged to mate flush with said surfaces, having slots in planes generally perpendicular to said sealing surfaces, some of said slots extending into said member from the side of both sealing faces with the edge of such slots located at said sealing faces, and others of said slots extending from the opposite side of said member from said faces and extending part way through both sealing faces to define a continuous serpentine sealing band remaining to contact each sealing surface and forming walls between the alternate slots which impart extensibility to said member lengthwise thereof.

References Cited by the Examiner

UNITED STATES PATENTS

| | | | |
|---|---|---|---|
| 2,311,731 | 2/1943 | Bowers | 277—215 |
| 2,951,318 | 9/1958 | Smith et al. | 277—189.5 X |
| 3,206,219 | 9/1965 | Hamm | 277—215 |

LAVERNE D. GEIGER, *Primary Examiner.*

J. S. MEDNICK, *Assistant Examiner.*